No. 864,800. PATENTED SEPT. 3, 1907.
J. L. PILLING.
OPERATING MECHANISM FOR TURN TABLES.
APPLICATION FILED APR. 20, 1907.
2 SHEETS—SHEET 1.
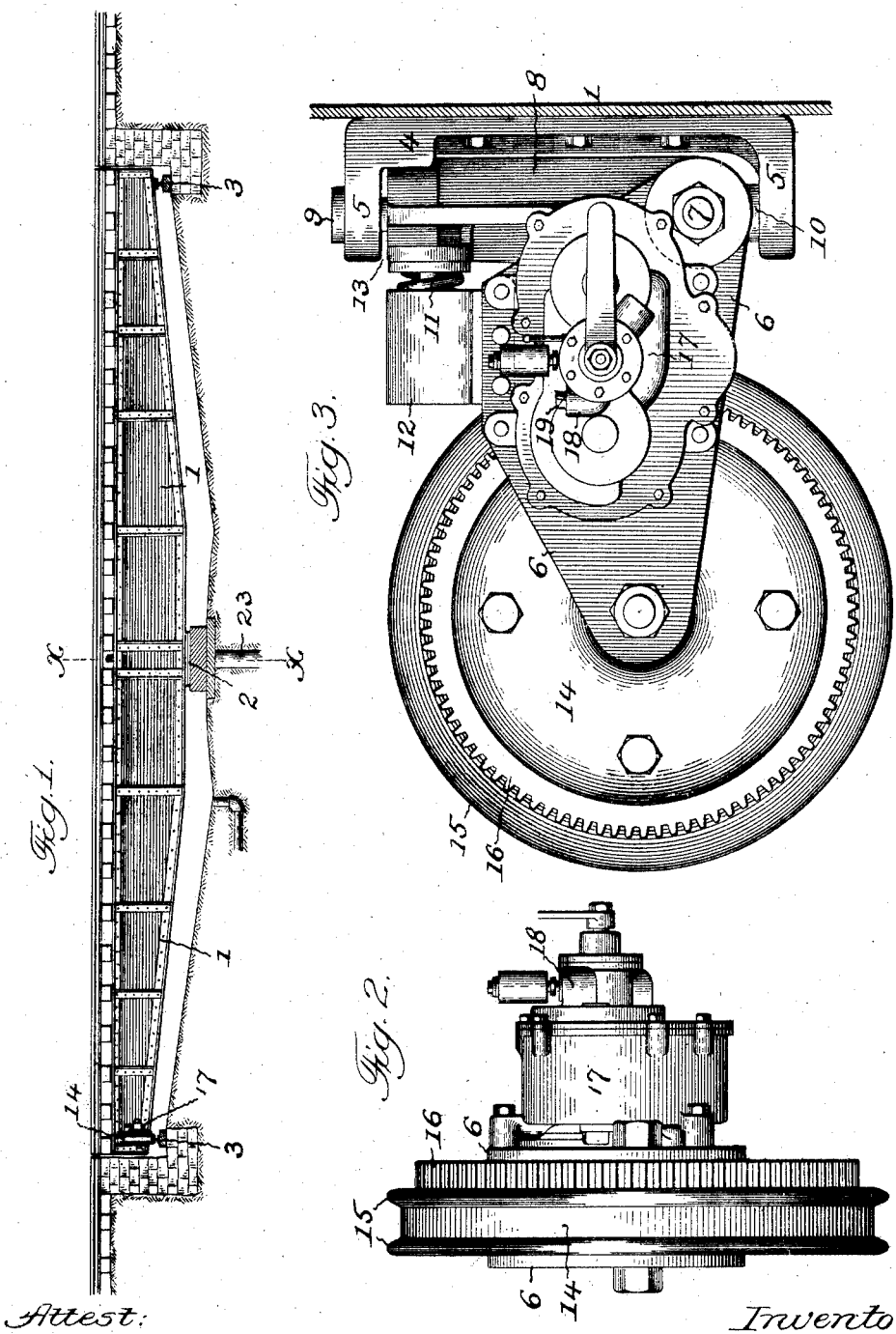
Attest:
John Enders
Henry Moe
Inventor:
James Lowe Pilling,
by Robert Burns
Attorney No. 864,800. PATENTED SEPT. 3, 1907.
J. L. PILLING.
OPERATING MECHANISM FOR TURN TABLES.
APPLICATION FILED APR. 20, 1907.
2 SHEETS—SHEET 2.
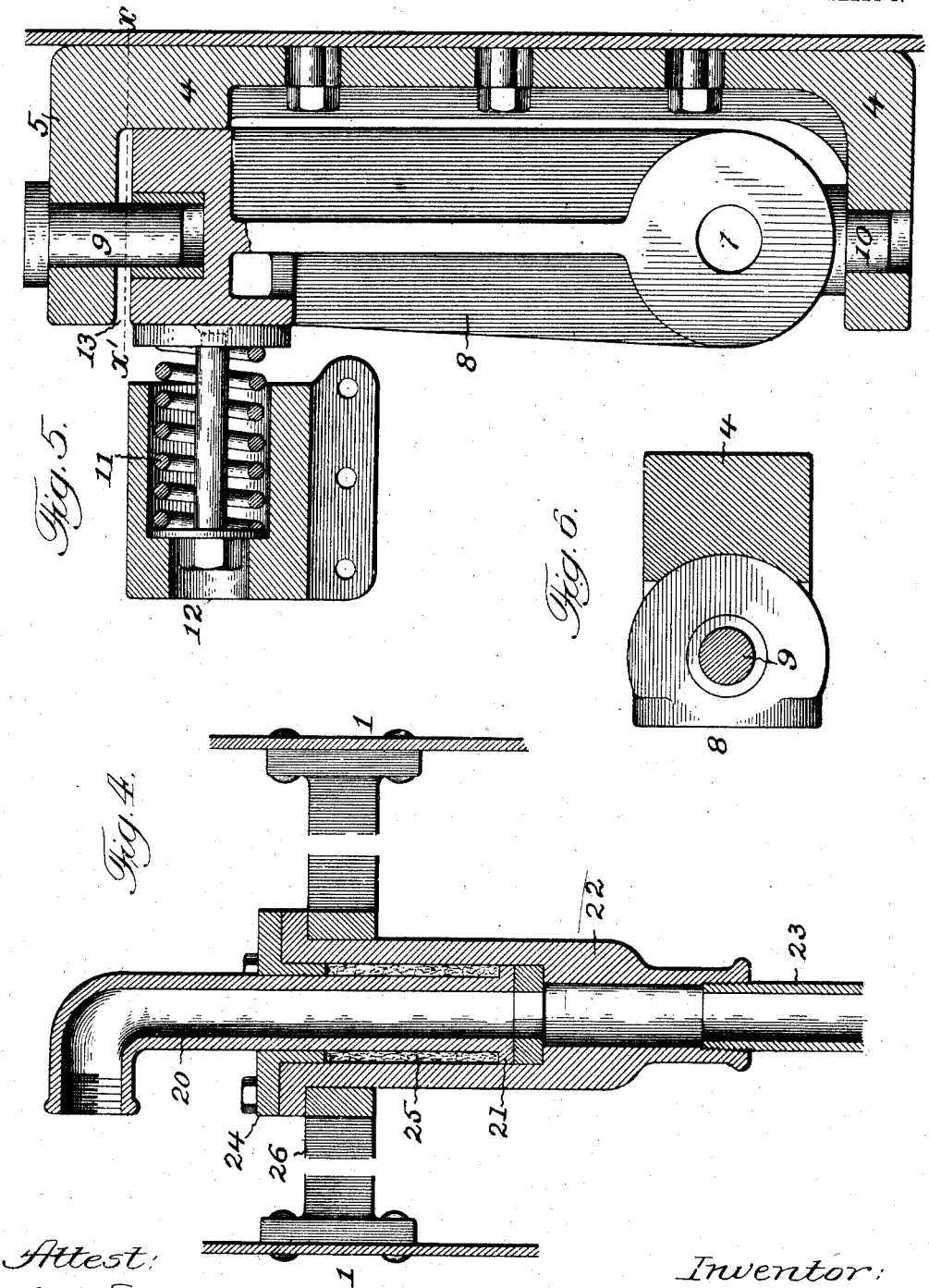
Attest:
John Enders.
Henry Mo.
Inventor:
James Lowe Pilling,
by Robert Burns
Attorney.

UNITED STATES PATENT OFFICE.

JAMES LOWE PILLING, OF CHICAGO, ILLINOIS.

OPERATING MECHANISM FOR TURN-TABLES

No. 864,800.          Specification of Letters Patent.          Patented Sept. 3, 1907.

Application filed April 20, 1907. Serial No. 369,212.

*To all whom it may concern:*

Be it known that I, JAMES LOWE PILLING, a citizen of the United States of America, and a resident of Chicago, in the county of Cook and State of Illinois, have invented certain new and useful Improvements in Operating Mechanisms for Turn-Tables, of which the following is a specification.

This invention relates to that type of railway turntables in which a power driven tractor is attached to one end of a turntable and has traction engagement upon a circular track rail to impart turning movement to the turntable. And the present improvement has for its object to provide a simple and efficient structural formation and combination of parts whereby the engagement of the tractor upon the circular track rail of the turntable is maintained regardless of irregularities in said track rail and at the same time afford a free adaptation of the tractor to circular tracks of different diameters met with in the general application of the apparatus to turntables.

A further object of the present improvement is to provide a safe and efficient means for conducting the supply of compressed air or other motive fluid to the driving motor of the tractor, all as will hereinafter more fully appear.

In the accompanying drawings: Figure 1, is a sectional elevation of a turntable having the present improvement applied. Fig. 2, is an end elevation of the power driven tractor. Fig. 3, is a side elevation of the same. Fig. 4, is an enlarged detail transverse section of the turntable on line $x-x$, Fig. 1. Fig. 5, is a detail vertical section of the universal connection between the tractor and the side of the turntable. Fig. 6 is a detail horizontal section of the same on line $x'-x'$ Fig. 5.

Similar numerals of reference indicate like parts in the several views.

Referring to the drawings, 1 represents a railway turntable mounted on a central bearing 2, and supported at its respective ends on a circular track 3, as usual in turntable constructions.

4 is a bracket piece attached to an end part of the turntable and having vertically alined pivot ears 5 for the pivotal attachment of the power driven tractor hereinafter described.

6 is the frame or housing of the tractor, formed preferably of a pair of plate members arranged in separated relation and pivotally attached by a horizontal pivot pintle 7 to an intermediate knuckle member 8, which in turn has pivotal connection by vertical pintles 9 and 10 with the pivot ears 5 of the attaching bracket 4, before described; the pivotal connections just described affording a universal adjustment of the tractor in relation to the turntable on which it is carried.

11 is a cushion or spring arranged in a horizontal position between the upper end of the knuckle member 8 and a housing or bracket 12 attached to the upper part of the frame or housing 6 of the tractor, and adapted to prevent the jar of the turntable in actual use from transmission as thrusts to the tractor.

In the present improved construction, the limited independent vertical movement which is required of the tractor with relation to the turntable is provided by a space or gap 13 left between the upper end of the knuckle member 8 and the lower end of the upper pivot ear 6, as shown in Figs. 3 and 5, which permits in a simple and effective manner the required limited vertical rise and fall of the tractor and intermediate knuckle member in actual use.

14 is the traction wheel journaled in the free end of the tractor frame or housing 6, and formed with flanges 15 at each side of its tread, so that its engagement on the track rail 3 will be positively maintained regardless of the universal adjustment afforded by the construction before described.

16 is a gear wheel secured to one side of the traction wheel and adapted to form a part of the intermediate driving connection between the track wheel and the motor hereinafter described.

17 is a fluid actuated engine or motor of any usual form mounted on the tractor frame or housing 6, with its shaft adapted to have the usual operative engagement with the gear wheel 16 aforesaid, by a pinion (not shown) as usual in the present type of apparatus.

18 is the motive fluid inlet of said engine to which the motive fluid supply pipe 19 is connected. Such motive fluid supply pipe will extend in any usual and suitable manner to the central part of the turntable where it has connection with a tubular section or gland member 20, arranged vertically at the center of the turntable with its vertical axis in line with the axis of rotation of the turntable.

21 is an out-turned circular flange on the lower end of the member 20 aforesaid.

22 is a stationary gland member attached to the stationary supply pipe 23 from which the supply of motive fluid of the system is received from any suitable source. Such gland member 22 is arranged in vertical alinement with the gland member 20 aforesaid, and its bore or chamber is adapted to receive the lower end of said member 20 as well as the flange 21 at the lower end of the same, as shown in Fig. 4.

24 is a packing cap or head closing the upper end of the gland member 22 aforesaid, and 25 is a packing interposed between said cap 24 and the flange 21 to insure a tight joint between the parts while permitting the turning of the movable gland member 20 in the stationary gland member 22, as the turntable rotates.

26 is a spider secured to the turntable and adapted to maintain the gland member 22 in proper central relation, while having a turning movement around the same.

Having thus fully described my said invention what

I claim as new and desire to secure by Letters Patent, is:—

1. A mechanism for operating turntables comprising in combination, a turntable, a circular track therefor, and a tractor connected to the turntable by a universal joint and provided with a traction wheel having bearing upon said track, substantially as set forth.

2. A mechanism for operating turntables comprising in combination, a turntable, a circular track therefor, and a tractor connected to the turntable by a universal joint and provided with a traction wheel having bearing upon said track, the universal joint comprising an attaching bracket having vertically alined ears, a vertical intermediate knuckle member connected to said ears by vertical pintles, and a horizontal pintle connecting the knuckle member with the frame of the tractor, substantially as set forth.

3. A mechanism for operating turntables comprising in combination, a turntable, a circular track therefor, and a tractor connected to the turntable by a universal joint and provided with a traction wheel having bearing upon said track, the universal joint comprising an attaching bracket having vertically alined ears, a vertical intermediate knuckle member connected to said ears by vertical pintles and having limited vertical movement thereon, and a horizontal pintle connecting the knuckle member with the frame of the tractor, substantially as set forth.

4. A mechanism for operating turntables comprising in combination, a turntable, a circular track therefor, a tractor connected to the turntable by a universal joint and provided with a traction wheel having bearing upon said track, the universal joint comprising an attaching bracket having vertically alined ears, a vertical intermediate knuckle member connected to said ears by vertical pintles, and a horizontal pintle connecting the knuckle member with the frame of the tractor, and a cushion interposed between the upper end of the frame of the tractor and knuckle member, substantially as set forth.

5. A mechanism for operating turntables comprising in combination, a turntable, a circular track therefor, a tractor connected to the turntable by a universal joint and provided with a traction wheel having bearing upon said track and formed with flanges at each side of its tread, substantially as set forth.

6. A mechanism for operating turntables comprising in combination, a turntable, a circular track therefor, a tractor connected to the turntable by a universal joint and provided with a traction wheel having bearing upon said track and formed with flanges at each side of its tread, the universal joint comprising an attaching bracket having vertically alined ears, a vertical intermediate knuckle member connected to said ears by vertical pintles and a horizontal pintle connecting the knuckle member with the frame of the tractor, substantially as set forth.

7. A mechanism for operating turntables comprising in combination, a turntable, a circular track therefor, a tractor connected to the turntable by a universal joint and provided with a traction wheel having bearing upon said track and formed with flanges at each side of its tread, the universal joint comprising an attaching bracket having vertically alined ears, a vertical intermediate knuckle member connected to said ears by vertical pintles and having limited vertical movement thereon, and a horizontal pintle connecting the knuckle member with the frame of the tractor, substantially as set forth.

8. A mechanism for operating turntables comprising in combination, a turntable, a circular track therefor, a tractor connected to the turntable by a universal joint and provided with a tractor wheel having bearing upon said track and formed with flanges at each side of its tread, the universal joint comprising an attaching bracket having vertically alined ears, a vertical intermediate knuckle member connected to said ears by vertical pintles and a horizontal pintle connecting the knuckle member with the frame of the tractor, and a cushion interposed between the upper end of the frame of the tractor and the knuckle member, substantially as set forth.

9. A mechanism for operating turntables comprising in combination, a turntable, a circular track therefor, a tractor connected to the turntable and provided with a fluid driven motor and with a traction wheel having bearing upon the track aforesaid, and a gland comprising a fixed and rotatable member arranged at the axis of rotation of the turntable, the rotatable member adapted for connection with the motor of the tractor and the fixed member for connection with the source of motive fluid supply, substantially as set forth.

Signed at Chicago, Illinois, this 17th day of April 1907.

JAMES LOWE PILLING.

Witnesses:
ROBERT BURNS,
HENRY MOE.